US006804602B2

(12) United States Patent
Impson et al.

(10) Patent No.: US 6,804,602 B2
(45) Date of Patent: Oct. 12, 2004

(54) INCIDENT-AWARE VEHICULAR SENSORS FOR INTELLIGENT TRANSPORTATION SYSTEMS

(75) Inventors: Jeremy D. Impson, Vestal, NY (US); Nader Mehravari, Ithaca, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 67 days.

(21) Appl. No.: 10/114,388

(22) Filed: Apr. 2, 2002

(65) Prior Publication Data

US 2003/0187571 A1 Oct. 2, 2003

(51) Int. Cl.[7] ............................ G06F 19/00; G06F 7/00

(52) U.S. Cl. ....................... 701/117; 701/118; 701/200; 73/178 R

(58) Field of Search ................................ 701/117, 118, 701/200, 213, 24; 73/178 R

(56) References Cited

U.S. PATENT DOCUMENTS

| | | | | |
|---|---|---|---|---|
| 4,350,970 A | | 9/1982 | Von Tomkewitsch | 340/23 |
| 4,757,450 A | | 7/1988 | Etoh | 364/426 |
| 4,833,469 A | | 5/1989 | David | 340/901 |
| 5,164,904 A | | 11/1992 | Sumner | 364/436 |
| 5,313,200 A | | 5/1994 | Sone | 340/905 |
| 5,539,645 A | | 7/1996 | Mandhyan et al. | 364/438 |
| 5,572,201 A | * | 11/1996 | Graham et al. | 340/902 |
| 5,592,172 A | | 1/1997 | Bailey et al. | 342/350 |
| 5,668,880 A | | 9/1997 | Alajajian | 380/49 |
| 5,875,412 A | * | 2/1999 | Sulich et al. | 701/207 |
| 5,933,100 A | | 8/1999 | Golding | 340/995 |
| 6,021,373 A | * | 2/2000 | Zuercher et al. | 701/300 |
| 6,067,031 A | | 5/2000 | Janky et al. | 340/903 |
| 6,073,062 A | * | 6/2000 | Hoshino et al. | 701/3 |
| 6,092,020 A | | 7/2000 | Fastenrath et al. | 701/119 |
| 6,144,296 A | * | 11/2000 | Ishida et al. | 340/461 |
| 6,150,961 A | | 11/2000 | Alewine et al. | 340/995 |
| 6,157,891 A | * | 12/2000 | Lin | 701/301 |
| 6,219,596 B1 | | 4/2001 | Fukae et al. | 701/23 |
| 6,236,933 B1 | | 5/2001 | Lang | 701/117 |
| 6,249,720 B1 | * | 6/2001 | Kubota et al. | 701/1 |
| 6,252,544 B1 | | 6/2001 | Hoffberg | 342/357.1 |
| 6,381,524 B1 | * | 4/2002 | Kuragaki et al. | 701/36 |
| 6,426,693 B1 | * | 7/2002 | Inomata | 340/539.21 |
| 6,434,450 B1 | * | 8/2002 | Griffin et al. | 701/1 |
| 6,526,335 B1 | * | 2/2003 | Treyz et al. | 701/1 |

OTHER PUBLICATIONS

Cowger, Eric W., *Implementing a Vehicle Location System*, Information Technologies, Inc. Mar., 2000, whole document, background material.

*Key Concepts of the National ITS Architecture*, www.iteris.com/itsarch/web/keyconcepts.htm, whole document, background material.

*ITS Physical Architecture*, Lockheed Martin Federal Systems, Odetics Intelligent Transportation Systems Division, Federal Highway Administration, US Department of Transportation, Washington, D.C. 20590, Dec. 1999, (CD).

*National ITS Architecture, Theory of Operations*, Architecture Development Team, Lockheed Martin Odetics Intelligent Transportation Systems Division, Federal Highway Administration, US Department of Transportation, Washington, D.C. 20590, Dec. 1999, (CD).

* cited by examiner

*Primary Examiner*—William A. Cuchlinski, Jr.
*Assistant Examiner*—Olga Hernandez
(74) *Attorney, Agent, or Firm*—Perkins Smith & Cohen LLP; Jacob N. Erlich; Kathleen Chapman

(57) ABSTRACT

A system and method for mobile platform real-time collection, transmission, and processing of an array of environmental and vehicle-related data in the context of an Intelligent Transportation System (ITS) network. The system and method provide enhanced in-vehicle data collection, enhanced communications capability between the vehicle and the ITS system, and enhanced ITS implementation functionality to provide real-time incident reporting to ITS users.

14 Claims, 14 Drawing Sheets

INCIDENT-AWARE VEHICULAR SENSORS FOR INTELLIGENT TRANSPORTATION SYSTEMS

BACKGROUND OF THE INVENTION

The present invention relates generally to telematics sensor systems, and, more specifically, to the collection and transfer of dynamic traffic and environmental data from mobile on-board collection systems to the Intelligent Transportation System (ITS) network. Most specifically, the present invention relates to collection of traffic incidents by mobile units, and processing of traffic incidents by the ITS network.

Sensor and locator systems within mobile devices, in particular within vehicles, are becoming commonplace, but the complete range of their utility has yet to be realized. Vehicular telematics systems usually include vehicle location systems that are based on Global Positioning System (GPS) technology and are thus capable of providing data to traffic analysis systems. Traffic analysis systems are also becoming widespread. These systems usually base their traffic predictions on traffic statistics, historical data, and data collected from specific sources such as specially-equipped vehicles or fixed-position sensors. Among these traffic analysis systems is an ITS network, which is an implementation of the United States National ITS Architecture (USITSA). The USITSA is a framework of physical elements on which ITS implementations, standards, and evaluation can be built. Current ITS implementations assist in traffic monitoring and emergency vehicle control by collecting and processing highway traffic data (vehicle speed and volume of traffic).

U.S. Pat. No. 5,164,904 discloses a traffic analysis system in which disparate sources of traffic information, including data from "sample vehicles", are fused. There is no connection between the ITS network and the '904 system. There is no general collection of data from any mobile source.

The ADVANCE system of the Illinois Department of Transportation (described in U.S. Pat. No. 5,933,100) includes the collection by vehicles of traffic-related data about the condition of recently-traversed streets. These data are transmitted to a base station/traffic information center through a radio frequency communications medium. The traffic information center combines data from all its sources to create a dynamic picture of the traffic situation. The ADVANCE system requires special equipment in the vehicle, beyond telematics equipment that is now becoming standard, to implement the system. In particular, the radio communications equipment requires specific frequencies that may interfere with other radio communications. This system is not related to the ITS network.

A Finnish transportation system, "Keiju", uses road maintenance vehicles to collect and distribute information on road maintenance in near real-time. The system automatically registers information on, for example, the number of times a plow is used, the distances traveled, materials used, and routes selected. This information is transferred to road weather service centers to describe changes in weather conditions on individual stretches of road. This system is confined to specially-equipped road maintenance vehicles.

U.S. Pat. No. 5,933,100 describes a system for personalized traffic reports and route planning as a function of street segment travel time data collected by specially-equipped vehicles. The travel time data are computed by special software and GPS data, and are transmitted through a cellular communications medium to a base station/central database and then back out to subscribers. The focus of this system is travel time. The system does not interface with the ITS network.

U.S. Pat. No. 6,067,031 discloses Location Detection (LD) through the GPS system that is used to evaluate the proximity of vehicles to each other data, thus providing a picture of traffic congestion for a commuting subscriber. This system is confined to proximity detection and does not provide a general picture of the road situation including, for example, the condition of the surface of the roadway.

Existing ITS implementations require pressure-sensitive sensors physically imbedded in the road, motion detecting sensors installed by the side of the road, and manual data entry. ITS sensors require regular maintenance. Furthermore, these sensors are prone to damage by weather, accidents, and construction work. No traditional ITS implementations allow for incident-awareness at the sensor level. Any knowledge that, for example, a traffic jam was caused by an accident must be inserted into the ITS network manually. Finally, it is expensive to outfit a highway with ITS sensors because of construction costs and the need to obtain right-of-way for the sensors and a connecting network.

A system is needed that would dynamically collect real-time ITS data from a great number of passenger and emergency vehicles, including traffic incident data. These data could replace or enhance data of current ITS implementations that are either static or collected in real-time from stationary sensors. The need for an in-vehicle computer and a network link from that computer to a wide area or other network has already justified its cost, and to make such systems work within an ITS implementation, very little additional hardware is needed.

BRIEF SUMMARY OF THE INVENTION

The problems set forth above as well as further and other problems are solved by the present invention. These solutions and other advantages are achieved by the illustrative embodiment of the invention described hereinbelow.

The system and method of the present invention include enhancements to existing ITS implementations as follows: (1) improvements to existing in-vehicle data collection systems to accommodate collection and processing of ITS data and traffic incident data, (2) improvements to the communications system between in-vehicle collection systems and ITS implementations, including a communications protocol element to insure vehicle anonymity, and (3) improvements to existing ITS implementations to receive real-time vehicle data and integrate those data with currently-collected data to create a report of the current traffic situation.

Unlike current ITS implementations, the system of the present invention does not require an infrastructure of sensors to be installed on the side of or under the road. Instead, vehicles become real-time data collectors and expand the coverage and predictive capability of the enhanced ITS implementation. The system and method of the present invention provide for enhancing existing integrated in-vehicle computer systems to include ITS data sensors. In-vehicle computer systems that include wireless communication ability and GPS receivers that are integrated with the vehicle's onboard data, diagnostic, and control bus can be upgraded by means of the present invention to transmit ITS data and traffic incident data. ITS data can include vehicle velocity (received from the vehicle's data, diagnostic, and control bus), vehicle location data (received from the GPS), proximity data (received from light or infrared sensors), and weather conditions data (received from on-board sensors). Traffic incident data can include, but are not limited to, the orientation of the vehicle, whether or not airbags are deployed, and the change in speed of the vehicle. The ITS implementation of the present invention processes vehicle data and status based on location before feeding it to the current ITS implementation processing algorithms that process real-time data collected from known locations.

The system and method of the present invention also provide for enhancing ITS implementation functionality to accept and process enhanced vehicular real-time sensor and incident data including data and status messages from emergency and other vehicular sensors. Emergency and construction vehicles contain specialized "sensors" that inject situational information into the system. For example, on-board sensors can allow the enhanced ITS implementation to detect gridlock, traffic jams, and accidents. Enhanced emergency service and rescue vehicle on-board sensors can provide knowledge of specialized incidents. For example, if an ambulance has its lights on but is stopped, it can inform the enhanced ITS implementation that there has been an accident at that location. For matters of personal privacy, an enhanced network transmission protocol ensures anonymity of identity of any source of vehicle traffic data.

The system of the present invention includes an ITS network for collecting, receiving, and processing roadway information from plurality of sources and a mobile collection system for collecting and transmitting location-tagged ITS data to an ITS implementation that is part of the ITS network, and an interface system that receives location-tagged ITS data into the ITS network, combines it with location-tagged from other mobile sources, and transmits the combined data within the ITS network. The system also includes a traffic system that receives location-tagged ITS data from the interface system and integrates the combined data with other roadway information. Further, the system includes a report system for preparing a traffic report using the integrated data.

The mobile collection system includes a sensor system for collecting mobile ITS data from at least one data probe, a location-detecting system for determining where the mobile ITS data were collected, and a location-tagging system that combines the mobile ITS data with the location where the data were collected to form location-tagged ITS data. The mobile collection system can remain anonymous to the ITS network through an anonymity system that is part of the mobile collection system. Finally, location-tagged ITS data are transmitted to the ITS network by a communications system. A computer receives the mobile ITS data and location, executes the location-tagging system and the anonymity system for preparation of the location-tagged ITS data for transmission within a communications message prepared by a communications system.

The anonymity system indicates that the identity of the mobile collection system is not to be connected, within the ITS network, with the location-tagged data that were collected by the mobile collection system. The anonymity system accomplishes this dissociation through use of an anonymity protocol that is part of the communications message that contains the location-tagged ITS data. On the ITS network receiving side, an ITS anonymity system receives the communications message into the ITS network and insures that the identity of the mobile collection system is not known to the ITS network.

The location-detecting system includes a Global Positioning System (GPS) receiver interface that is electronically connected to the computer and a GPS receiver that receives GPS data which provide collection location data.

Possible mobile collection system data probes include, but are not limited to, thermometer, barometer, anemometer, brightness gauge, windshield wiper activity meter, vehicle velocity gauge, proximity detector, vehicle orientation detector, vehicle speed differential detector, vehicle airbag sensor, and vehicle lighting gauge.

The communications system includes a wireless receiver for sending and receiving communications messages to and from the mobile collection system and a communications interface for transferring communications messages between the wireless receiver and the computer. The communications system also includes a message system that appends a communications protocol to the communications messages.

The method of the present invention includes the steps of receiving real-time vehicle status data, vehicle incident data, and ITS data from a plurality of in-vehicle on-board sensors, location-tagging the data, preserving source anonymity of the data, integrating the data with other data such as static and dynamic data from historical databases and fixed-location sources, respectively, and preparing traffic information reports based on the data.

For a better understanding of the present invention, reference is made to the accompanying drawings and detailed description and its scope will be pointed out in the appended claims.

DETAILED DESCRIPTION OF THE INVENTION

The system and method of the present invention include modifications and enhancements to mobile units installed in on-road vehicles to equip them to act as mobile collectors of ITS data and traffic incident data, and modifications and enhancements to current USITSA implementation functionality in the Transportation Layer.

Figure 1:
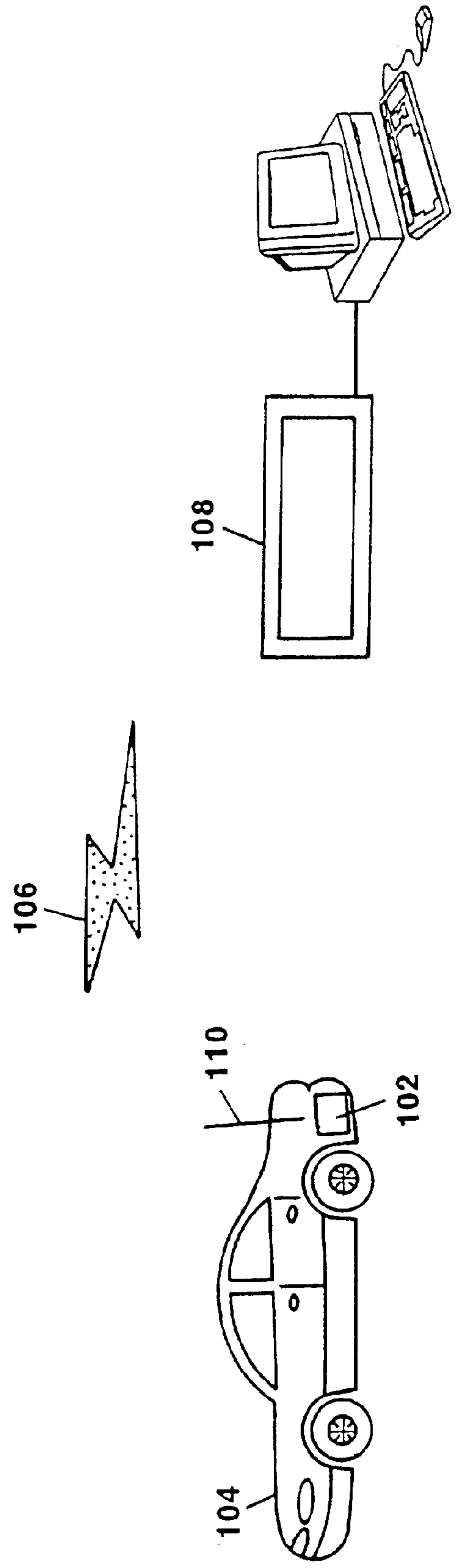
Figure 1 (PRIOR ART)
FIG. 1 is a schematic diagram of a prior art vehicular sensor unit equipped with telematics including a GPS system and additional probes and processing software.

An on-road vehicle 104, as shown in FIG. 1, can be conventionally equipped with a mobile unit 102 that resides in the vehicle 104, a communication medium 106 through which data are transmitted, a base unit 108 that receives all incoming data messages from the vehicle's mobile unit 102, and map and vehicle display software to display information such as the current position of the vehicle over a local area map. The mobile unit 102 can contain a GPS receiver 110, a conventional controller, and an integrated communication device or an interface to an external communications medium 106. The communications medium 106 enables handshaking between the mobile unit 102 and the base unit 108. The medium 106 can be radio, switched circuit cellular, Cellular Digital Packet Data (CPDP), Personal Communication Services (PCS), communication satellite, or some combination of these. The base station 108 forwards location and other data to its destination, which may simply be the vehicle's map and display software. Map and vehicle display software conventionally displays vehicle position on a local area map and updates the display with each incoming position message. The mobile unit 102 generally receives power from the vehicle's battery.

Figure 2:
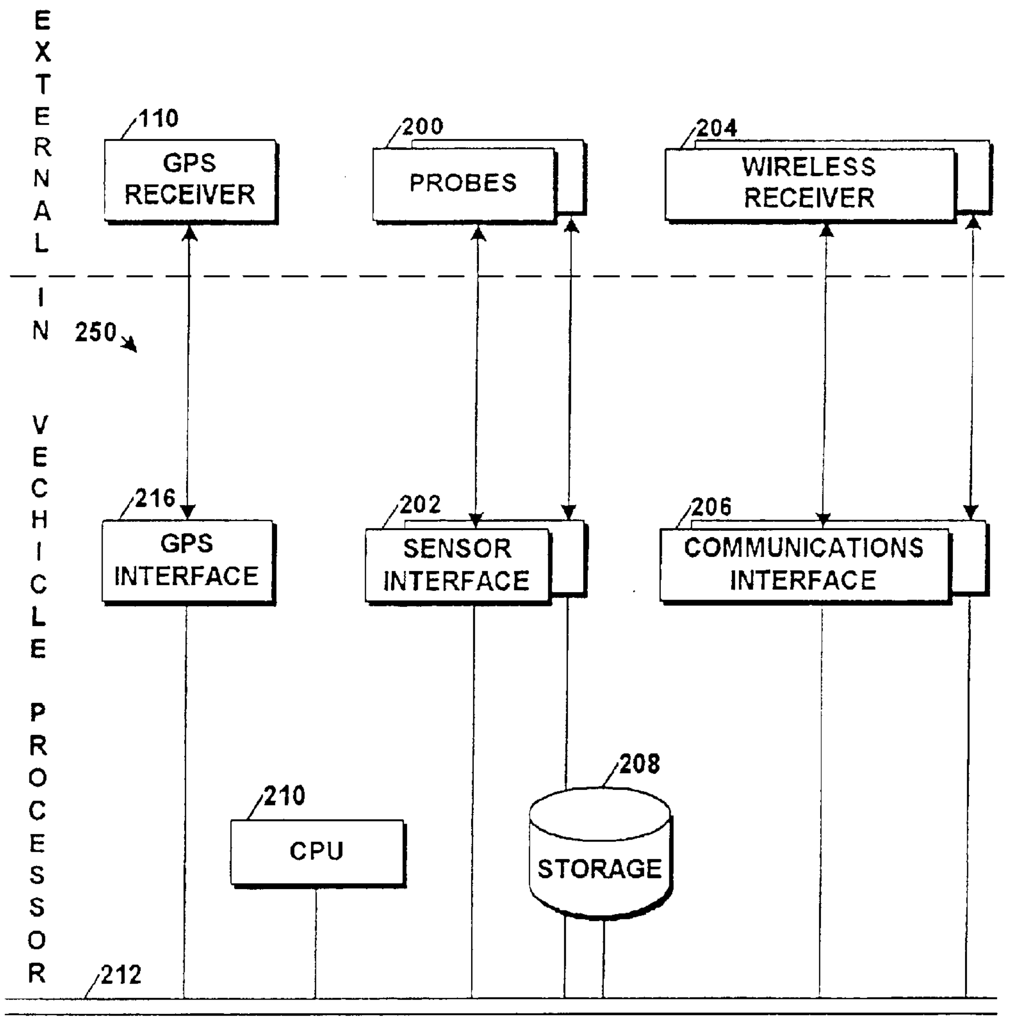
FIG. 2 is a schematic diagram of the in-vehicle sensor and data processing system to collect and process in-vehicle ITS data of the illustrative embodiment of the present invention.
Figure 6B:
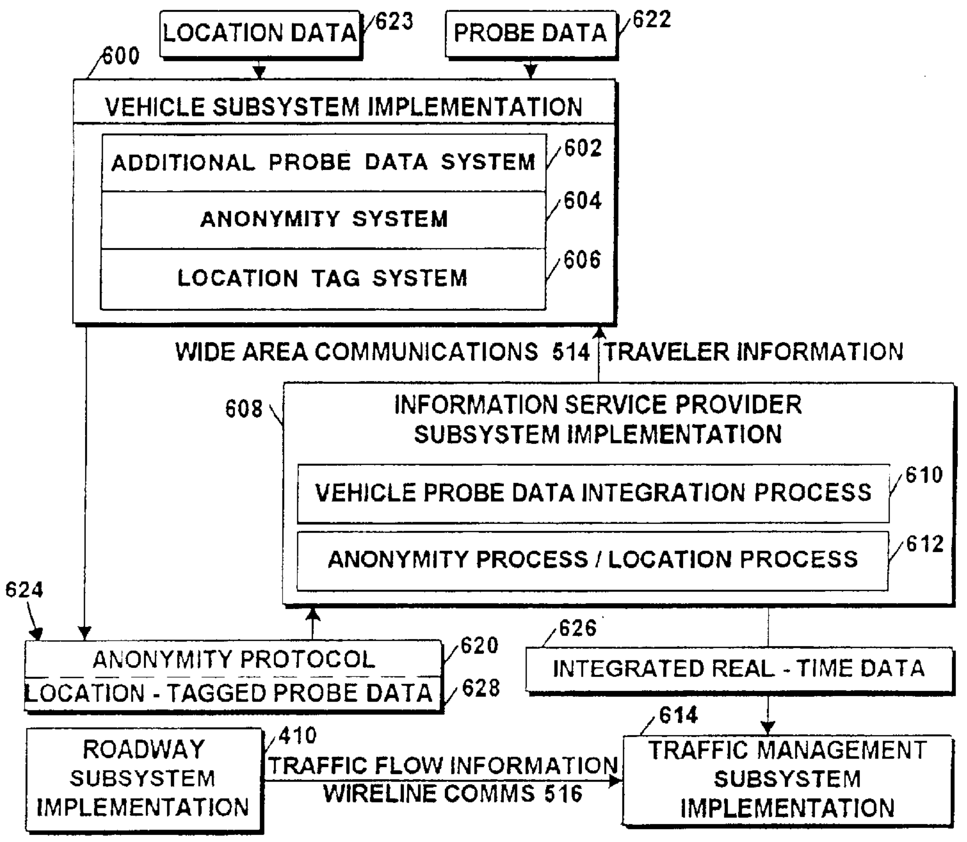
FIGS. 6A and 6B are schematic diagrams of the system of the present invention and the enhanced functions and interfaces within the illustrative embodiment of the present invention, respectively, including the details of a Vehicle subsystem implementation of the enhanced USITSA implementation.
Figure 6A:
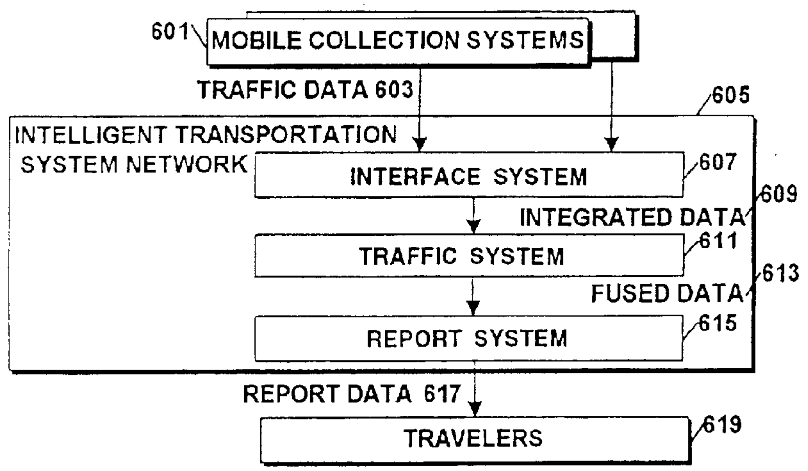

The illustrative embodiment of an in-vehicle system of the present invention is shown in FIG. 2, with reference to system elements depicted in FIG. 6A. The system of the present invention operates in the environment of enhanced mobile unit 250, which is an illustrative embodiment of mobile collection system 601, including special probe processing for additional probes and enhanced communications protocol to protect the anonymity of vehicle 104 while it communicates with a USITSA implementation. In the illustrative embodiment, vehicle probes 200 gather data from the vehicle 104 itself and from the environment surrounding the vehicle 104 through factory-installed or add-on probes 200 connected to sensor interfaces 202. In the illustrative embodiment, probes 200 collect data that are passed to sensor interface 202 through serial or USB connections, for example. The sensor interfaces 202 can be directly connected to the vehicle's data/diagnostic/control bus 212. Probes 200 can measure temperature, barometric pressure and tendency, precipitation, wind speed, wind direction, relative humidity, road condition, neighboring vehicle proximity, vehicle orientation, airbag status, vehicle differential speed, and other vehicle characteristics, among other things. Vehicle location is established by its GPS receiver 110 and interface 216, which can be directly connected to the vehicle's computer bus 212. Among other possibilities for ITS network communication, the vehicle 104, by incorporating the system of the present invention, uses a wireless receiver 204 connected to a mobile unit communications interface 206. Referring to FIG. 6B, location data 623 gathered from the GPS system 110/216 and probe data 622 collected by probe system 200/202 are processed by conventional CPU 210, and perhaps stored in conventional volatile or mass storage 208.

Figure 3:
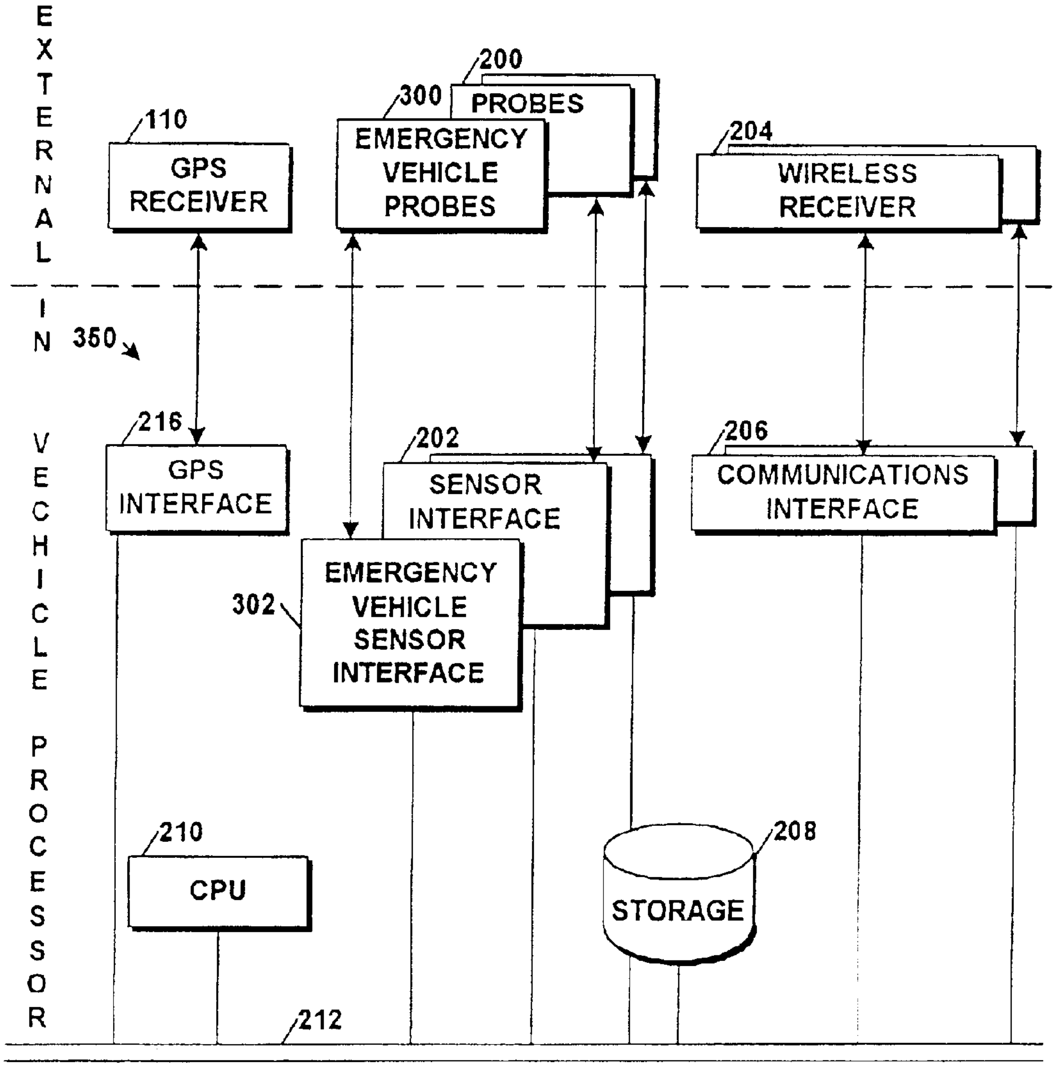
FIG. 3 is a schematic diagram of the emergency in-vehicle sensor and data processing system to collect and process in-vehicle ITS data of the illustrative embodiment of the present invention.

Referring now to FIG. 3, in an enhanced emergency mobile unit 350 of an in-vehicle emergency vehicle system of the illustrative embodiment of the present invention, emergency vehicles are equipped with emergency vehicle probes 300 and probe interfaces 302, the latter of which can be connected to the emergency vehicle's data/control/diagnostic bus 212. The same sensor interfaces/probes 202/200, conventional GPS interface/receiver 216/110, conventional communications interface/receiver 206/204, and conventional CPU/storage systems 210/208 as illustrated in FIG. 2 with the addition of features specific to emergency incidents are shown in FIG. 3.

To the extent that the present invention involves enhancements to existing systems, a clearer understanding of the present invention can be gained by reference to the prior art depicted in FIGS. 4A, 4B, 4C, and 5, and described herein, wherein prior art components used herein are conventional and described in greater detail below. To place the following explanation in the context of the present invention, however, a summary of the components of the system of the present invention, as depicted in FIG. 6A, are given. The system of the present invention includes a mobile collection system 601 that collects mobile traffic data, collects vehicle status data, and collects incident data. These data, collectively known as traffic data 603, are transmitted to an ITS network 605 for initial processing by an interface system 605. The interface system 605 combines incoming mobile collection system traffic data 603 from a plurality of mobile collection systems 601. These integrated data 609 are transferred within ITS network 605 to a traffic system 611 where they are fused with data from other sources. These fused data 613 are transferred within the ITS network 605 to a report system 615 that transforms the fused data 613 into report data 617 that is suitable for use by travelers 619.

Returning to FIGS. 4A, 4B, 4C, and 5, the structure for prior art USITSA implementations is provided by the USITS architecture 100 which consists of three layers related as depicted in FIG. 4A: a Communications layer architecture 402, including identification of communication technologies and systems which are used to exchange data within the transportation layer architecture 400; a Transportation layer architecture 400 including functions required to implement ITS user services; and an Institutional layer architecture 406 which provides structure to the forces specifying USITSA requirements and deploying USITSA implementations.

The Communications Layer 402 specifies general requirements to allow communications among USITSA functions. Four types of traditional communications are called for with the assumption that users will adopt existing and emerging technologies as they develop. Specific recommendations are that beacon technologies are ideally suited to several types of USITSA communication requirements where it is desirable to communicate with a vehicle within the immediate proximity in a very short period of time. More general communication requirements between vehicles and the infrastructure are accommodated with existing deployed wide area wireless technology. Other communications systems that are within the scope of the USITSA framework are advanced vehicle-vehicle and traditional wireline communications.

Figure 4A:
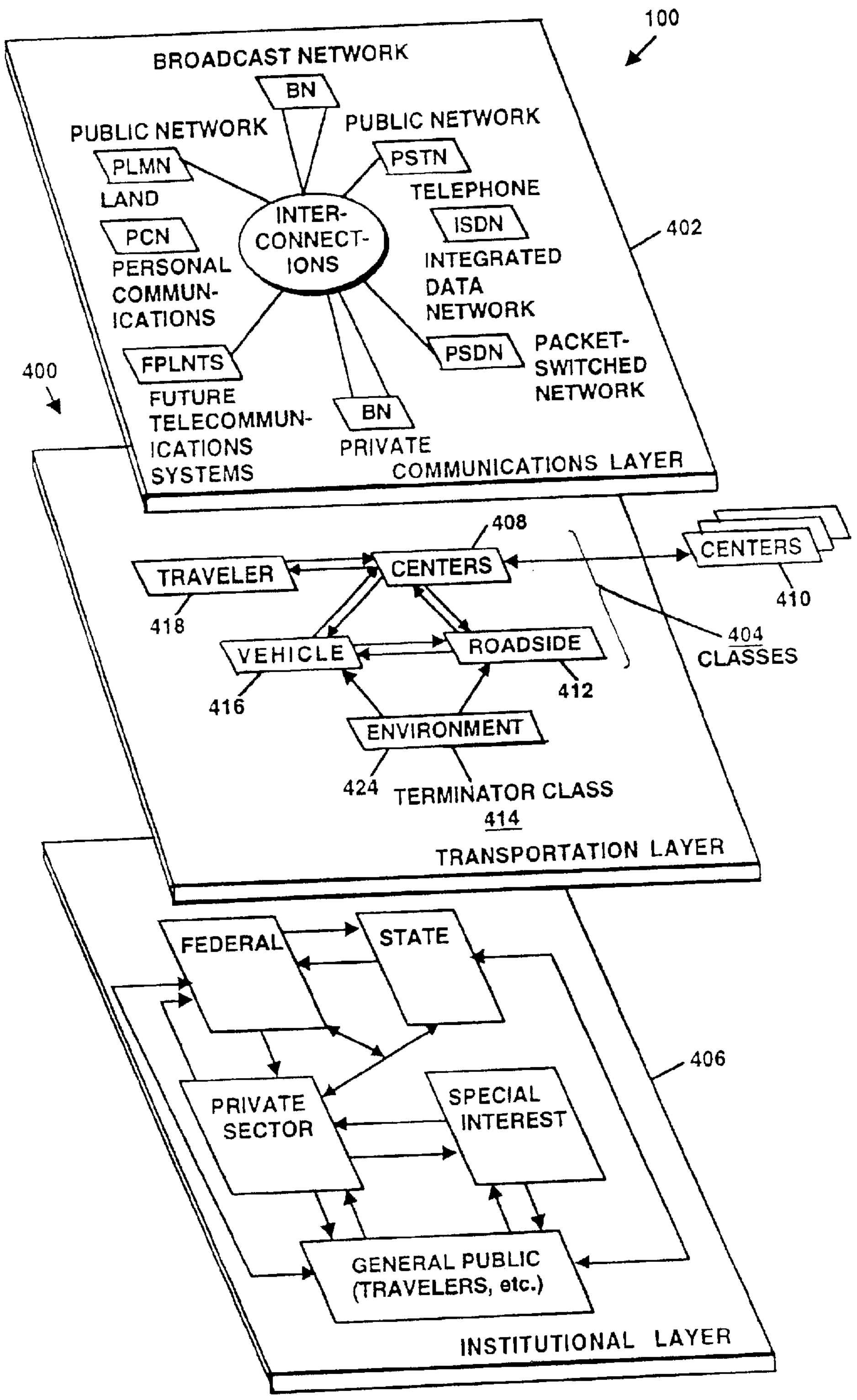
Figure 4A (PRIOR ART)
FIGS. 4A, 4B, and 4C include a prior art schematic diagram of the layers of the USITSA framework, a prior art flow diagram of the Transportation layer of the USITSA framework, and a prior art interconnect diagram of the Transportation layer of the USITSA framework, respectively.
Figure 4B:
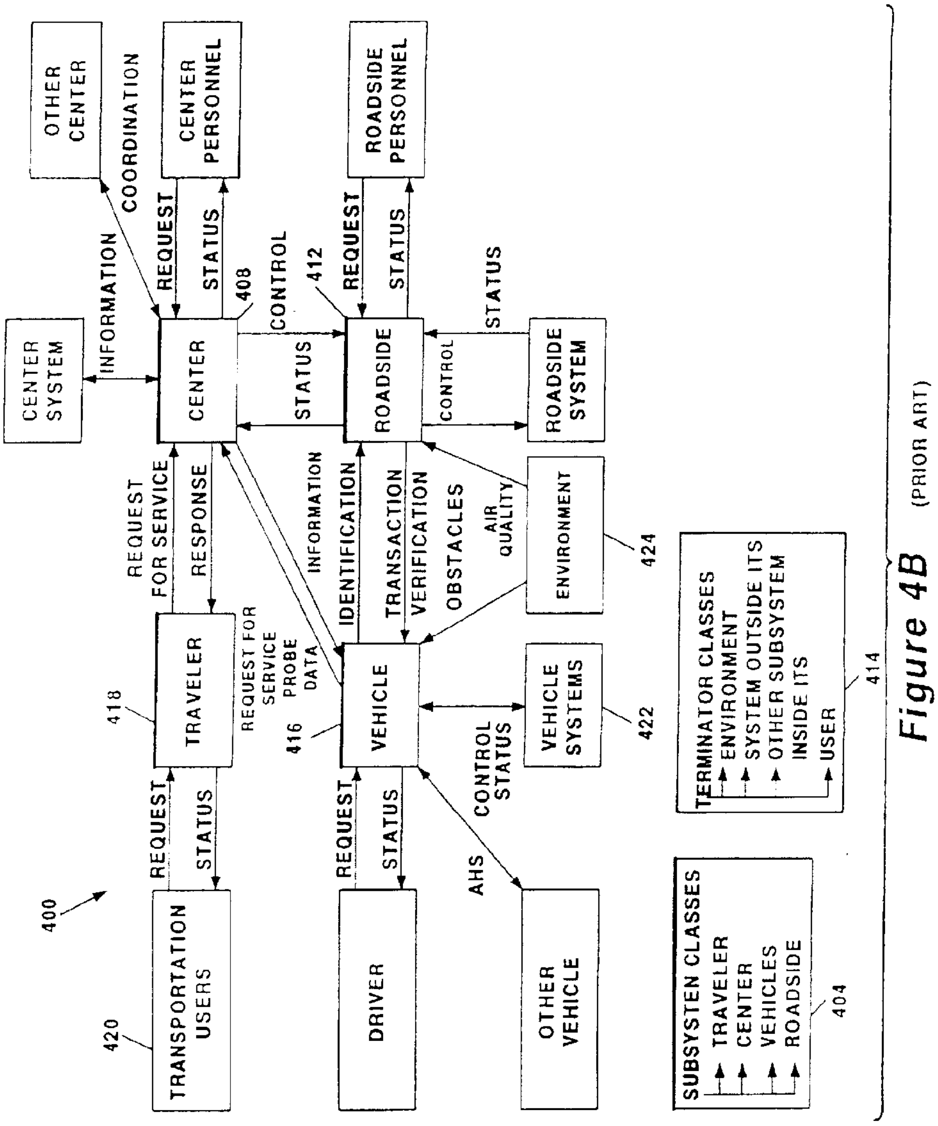
Figure 4B (PRIOR ART)
Figure 4C:
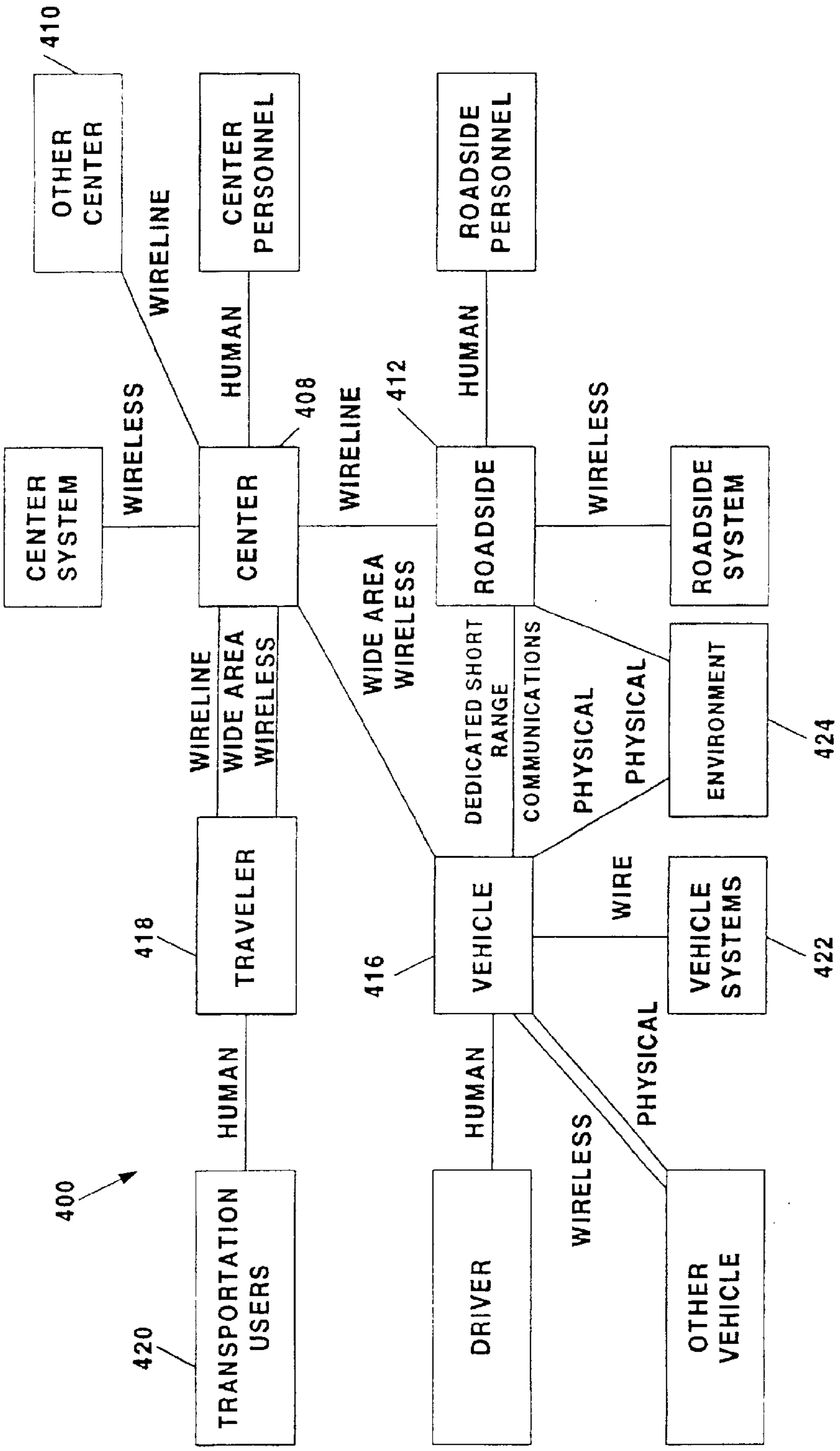
Figure 4C (PRIOR ART)

Each function defined in the USITSA Transportation layer architecture 400 is contained with one of the nineteen subsystems (see FIGS. 4B and 4C), each subsystem falling into either a subsystem class 404 or a terminator class 414, among which are defined logical data flows (as depicted in FIG. 4B) and physical data flows (as depicted in FIG. 4C). Subsystem classes 404 are: (a) Centers subsystem class 408 which defines functions for receiving, processing, and storing information within the ITS network; (b) Roadside subsystem class 412 which defines functions for deploying data collection devices along the side of the road at many locations to support collection of ITS data; (c) Vehicle subsystem class 416 which defines functions specific to vehicle interface with Vehicle Systems 422 and Environment terminator 424 in a USITSA implementation; and (d) Travelers subsystem class 418 which defines functions specific to ITS users with transportation needs.

Figure 5:
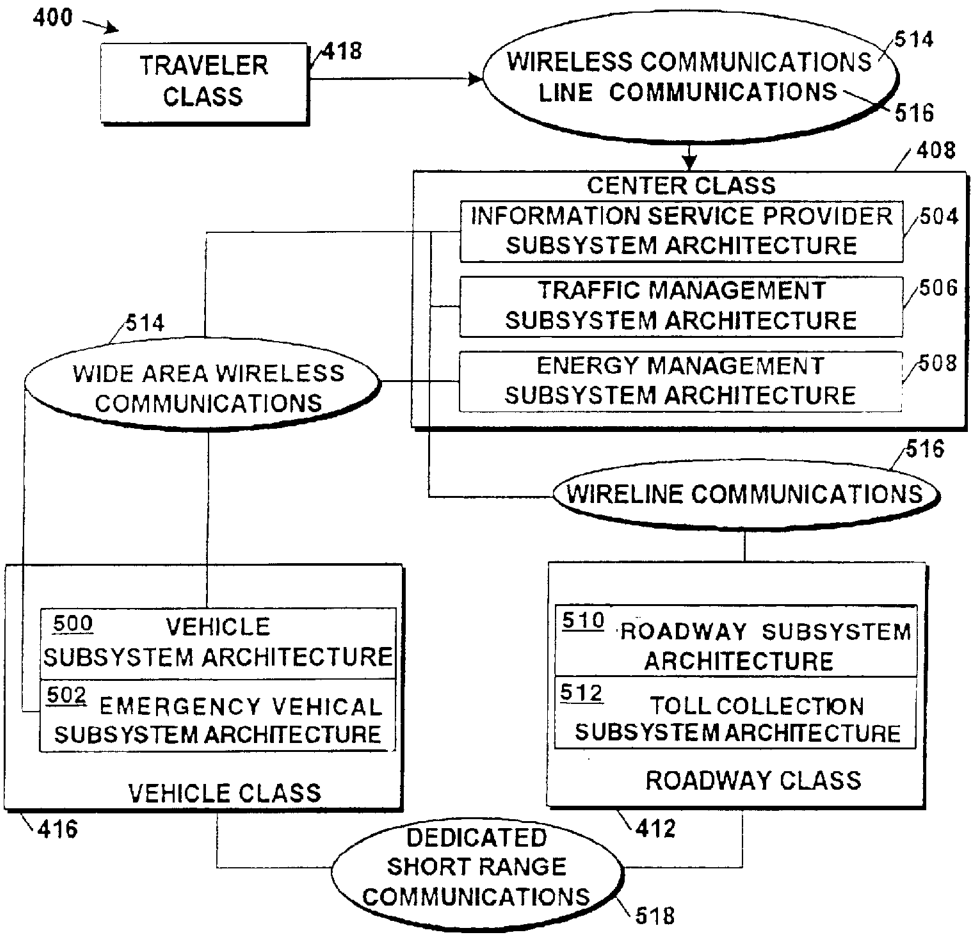
Figure 5 (PRIOR ART)
FIG. 5 is a prior art schematic diagram of subclasses and interconnections of subsystems, terminators, and users of the Transportation layer of the USITSA.

Referring to FIG. 5 which provides detail of the prior art Transportation layer architecture 400, Centers class 408 architecture defines subsystem architectures Information Service Provider (ISP) 504, Traffic Management 506, Emergency Management 508, among others. Vehicles subsystem class 416 specifies functions that are defined in Vehicle subsystem architecture 500, which functions are further contained and enhanced within Emergency Vehicle subsystem architecture 502, among others. The implementation of these subsystem architectures includes the enhancements and modifications of an illustrative embodiment of the present invention. As FIG. 5 depicts, the Transportation layer architecture 400 defines wireless 514 and wireline 516 communications between the Traveler subsystem class 418 functions and the Center subsystem class 408 functions. Also defined are wireline 516 communications between the Roadside subsystem class 412 functions and Center subsystem class 408 functions. Finally, Vehicle subsystem class 416 functions communicate with Center subsystem class 408 functions through wireless communications 514, and with Roadside subsystem class 412 functions through dedicated short-range communications 518.

Within the USITSA Transportation layer 400 is a Vehicle subsystem class 416 Vehicle subsystem architecture 500 that specifies functionality that can be implemented in a mobile platform such vehicle 104 or an emergency vehicle. The Vehicle subsystem architecture 500 includes sensory, processing, storage, and communications functions necessary to support efficient, safe, and convenient travel. Both one-way and two-way communications functionality is defined to support a spectrum of information services and sensors. The Vehicle subsystem architecture 500 defines functionality for managing probes that have the capability and intelligence to sense and send road conditions as the vehicle travels. Smart probe data may include road surface conditions and weather information. Vehicle subsystem architecture 500 functions include receiving input from sensors located on-board vehicle 104, continuously analyzing sensor data and providing it for use within the ITS network. The Emergency Vehicle subsystem architecture 502 specifies the functionality residing in an emergency vehicle. In an emergency vehicle in which the ITS architecture is implemented, the functionality specified by the Emergency Vehicle subsystem architecture 502 is combined with the functionality specified by the Vehicle subsystem architecture 500 to form a complete package for emergency vehicles.

Center subsystem class 408 defines functions for communicating with other Center subsystem classes 410 to enable coordination across jurisdictions within a region. Center subsystem class 408 defines functions for receiving/transmitting data from/to Roadside subsystem class 412 and Vehicle subsystem class 416 and for preparing traffic control and coordination information to be sent to Traveler subsystem 418. The interfaces between these subsystem classes represent not only physical interfaces between equipment and computers but between operating agencies in the real world. Some interfaces are very clearly data flows which can be carried by communication media. Some interfaces are fuzzier representing physical observation, contact, or human interaction.

Within the USITSA Transportation layer 400 Center subsystem class 408 is an Information Service Provider (ISP) subsystem architecture 504 that includes functions that collect, process, store, and disseminate transportation information from non-emergency vehicles. The ISP subsystem architecture 504 includes functionality for general data warehousing, transportation system operator data collection, and data redistribution among system operators and other ISP subsystems. The ISP subsystem architecture 504 also specifies bridge functions between information collectors/producers and subscribers that use the information.

An Emergency Management subsystem architecture 508, defined in the Transportation layer 400 Center subsystem class 408, includes functions performed by emergency centers supporting public safety. The prior art Emergency Management subsystem architecture 508 specifies functionality for operating in various emergency centers supporting public safety. Emergency Management subsystem architecture 508 functions include tracking and managing emergency vehicle fleets using automated vehicle location technology and two-way communications with the vehicle fleet.

A Traffic Management subsystem architecture 506, defined in the Transportation layer 400 Center subsystem class 408, specifies functions performed within a traffic management center or other fixed location to monitor and manage traffic flow. The prior art Traffic Management subsystem architecture 506 specifies functionality for operating within a traffic management center or other fixed location to monitor and manage traffic flow. Functions are defined to detect and verify incident information that is reported to emergency centers (functionality specified by Emergency Management subsystem architecture 508) in the form of current traffic information, road conditions, and camera images that can be used to locate and verify reported incidents. The Traffic Management subsystem architecture 506 specifies functionality for integrating data received from the various sources, including from the Vehicle subsystem architecture 500 through the ISP subsystem architecture 504 and from the weather service, and formulating traffic information reports for use by travelers.

Finally, within the Transportation layer 400 Terminator class 414 is defined the Environment Terminator architecture 424 which specifies the operational setting of the ITS implementation. This setting can consist of weather effects such as snow, rain, fog, pollution, dust, temperature, humidity, solar radiation, and man made electromagnetic effects. Environmental conditions are monitored by the functions implemented in the context of the USITSA framework 100 so that travelers may be informed and control strategies can reflect adverse environmental conditions in a timely fashion.

Referring now to FIG. 6B, probe and location data 622 and 623, illustrative embodiments of traffic data 603, are processed by Vehicle subsystem implementation 600 processes additional probe data system 602 and location tag system 606, and packetized for transmission, perhaps using anonymity system 604, to a USITSA ISP subsystem implementation 608, an illustrative embodiment of Intelligent Transportation System Network 605, among other places. When necessary, the location-tagged probe data 628 are wrapped in a special anonymity-preserving communications message 624. A non-emergency vehicle sends ITS data through a wireless link 514 to USITSA ISP subsystem implementation 608. Probe data 628 continue through the USITSA implementation as integrated real-time data 626, the illustrative embodiment of integrated data 609, to their final processing destination, a USITSA Traffic Management subsystem implementation 614, for integration with other traffic data.

Continuing to refer to FIG. 6B, data received into the ITS network from a non-emergency vehicle by the ISP implementation 608 are processed by anonymity/location tag system 612 to interpret location-tagged probe data 628 and anonymity protocol 620, and data integration system 610 to integrate location-tagged probe data 628 with data from other real-time data collection systems. When the ISP implementation 608 receives location-tagged probe data 628 from the Vehicle subsystem implementation 600, it performs appropriate processing to integrate all sources of location-tagged anonymous data 628 to create integrated data 626. These integrated data 626 are formatted for transmission to the Traffic Management subsystem implementation 614.

Figure 7:
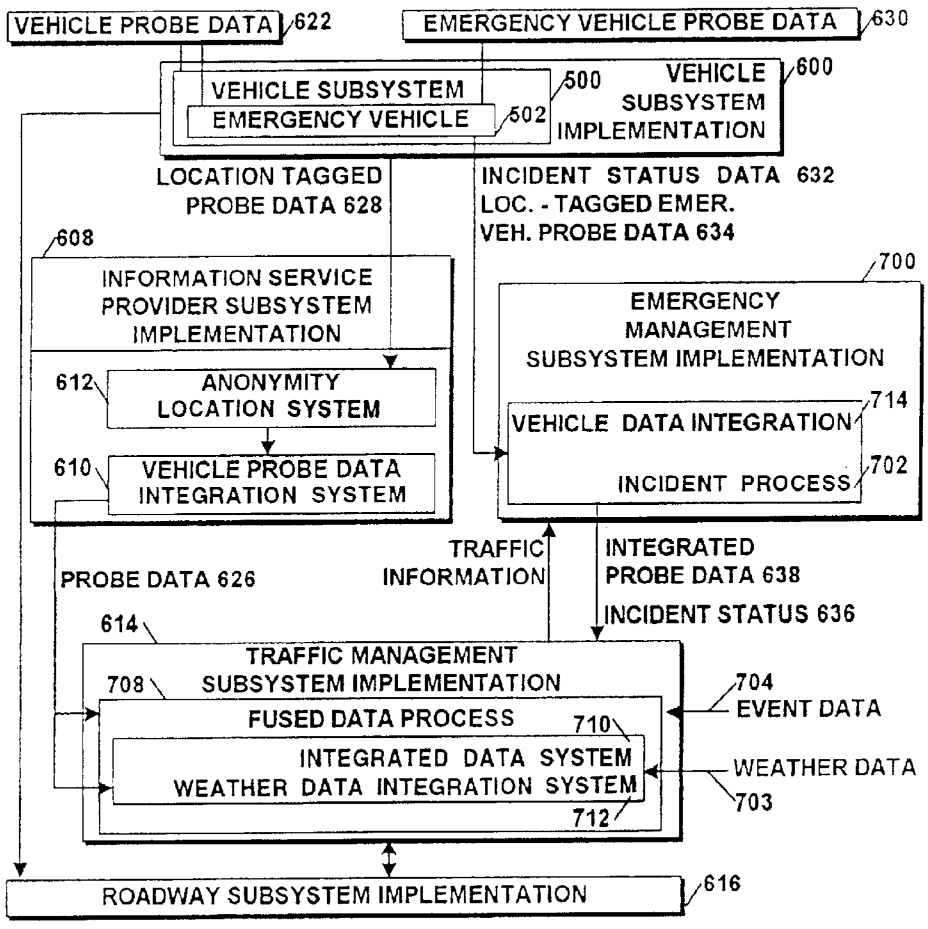
FIG. 7 is a schematic diagram of the enhanced functions and interfaces within the illustrative embodiment of the present invention of Traffic Management and Emergency Management subsystem implementations of the enhanced USITSA implementation.

Referring now to FIG. 7, Emergency vehicles 502 collect Emergency ITS probe data 630 and emergency incident status, format the data and send them as incident status data 632 and location-tagged probe data 634 to a USITSA Emergency Management subsystem implementation 700. The Emergency vehicle subsystem architecture 502 defines functions for receiving and processing specialized emergency vehicle information. In Vehicle subsystem implementation 600, the Emergency vehicle 502 receives emergency vehicle probe data 630 and converts it, as necessary, to incident status data 632, which are transmitted to the Emergency Management subsystem implementation 700, along with previously-described location-tagged vehicle probe data 434 gathered from emergency vehicles. The Emergency Management subsystem implementation 700 includes a system for combining received probe data 634, vehicle data integration system 714, and a system for handling 702 incident data 632, which computes an "incident status" parameter.

The Traffic Management subsystem implementation 614, the illustrative embodiment of traffic system 611, receives combined real-time vehicle data 626 and 638. An integration system 710 integrates these location-tagged data with each other. If some of the probe data 622 and 630 include weather data, a system for receiving external weather information 703 and integrating it 712 with weather probe data 622/630. Ultimately, these real-time data are fused 708 with other sources of data which could include data from the Roadway subsystem implementation 616 and roadway-impacting event data 704. After real-time data are fused 708 through prior art and enhanced algorithms with time-static and location-static data, these fused data, the illustrative embodiment of fused data 613, are used to create traffic reports and perform emergency vehicle fleet management, provide traveler information, and transmit fleet management, among other uses.

Figure 8:
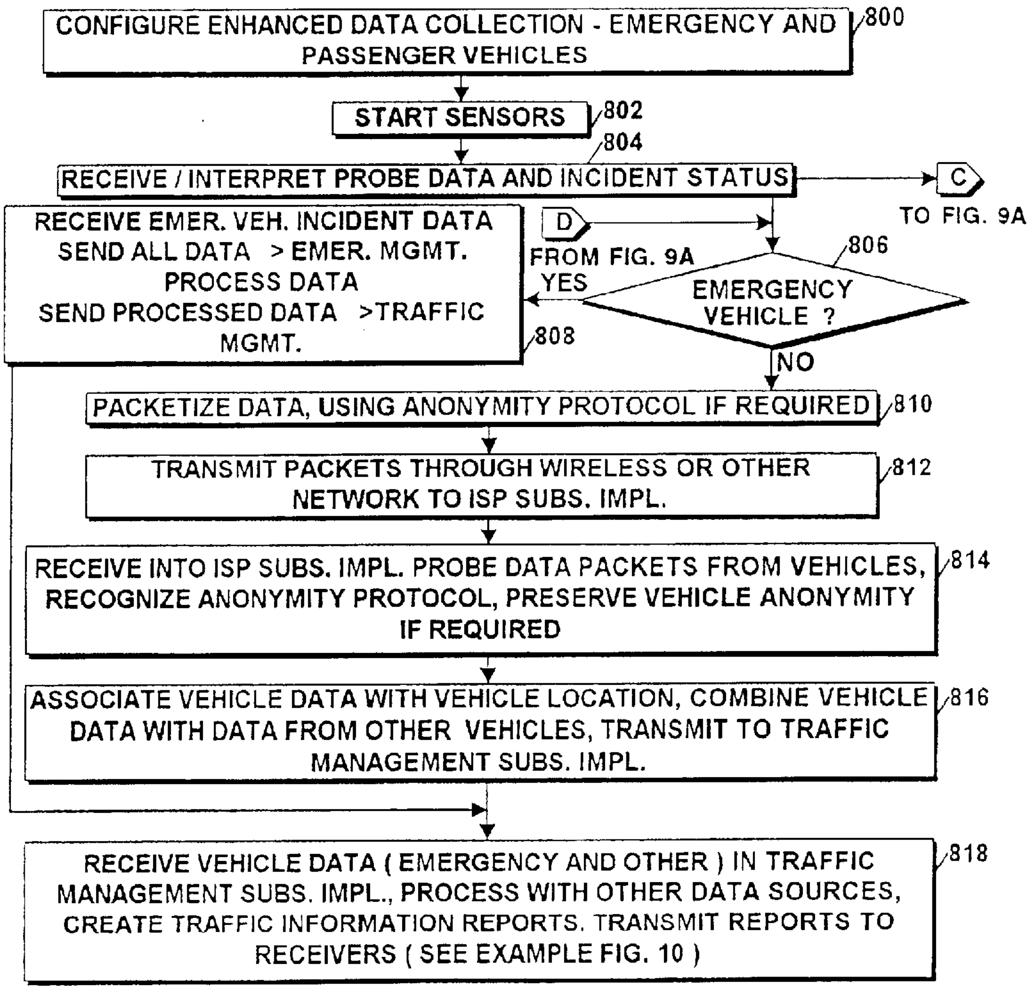
FIG. 8 is a flow chart of the method for practicing an illustrative embodiment of the present invention.

A method of use of the system of the illustrative embodiment is depicted in the flowchart of FIG. 8 with specific reference to the system elements in FIGS. 2, 3, 6B, and 7 described herein below. First probes 200 and 204 are configured in vehicle 104 either by the vehicle operator, automatically, or remotely by the ITS system (method step 800). In the illustrative embodiment, all of probes 200/204 in vehicle 104 can be configured, or only a subset, depending on the type of data to be gathered and the operational status of the equipment. Next, probes 200/204 are activated, either automatically, by the vehicle operator, or at the command of the ITS (method step 802). Handshaking takes place during this step so that the USITSA implementation can track the type, quantity, and source of information, while preserving the anonymity of the vehicle and driver, when necessary, through the system of the present invention. Data collection now begins, and probe data 622 are received into vehicle 104 through probe interfaces 202/206, transferred over data bus 212 to the CPU 210, possibly saved in storage 208, and processed by CPU 210. What type of processing is done depends on how the data are expected to be received in the USITSA implementation. An example of processing received probe data 622 is shown in FIGS. 9A–9B and described as follows.

Figure 9A:
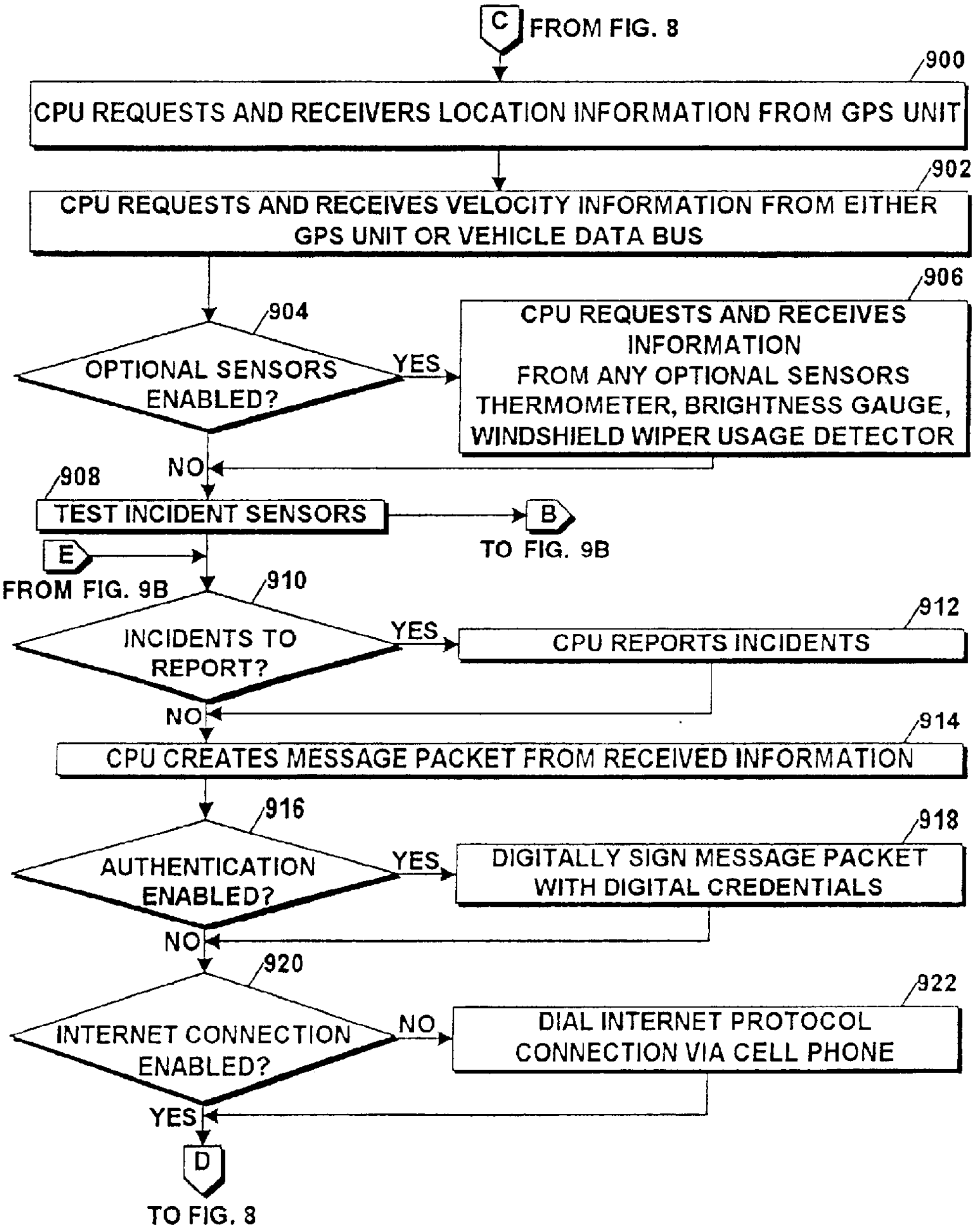
FIGS. 9A and 9B are flow charts of the method of this invention for practicing an illustrative embodiment of in-vehicle probe collection and processing of the present invention.
Figure 9B:
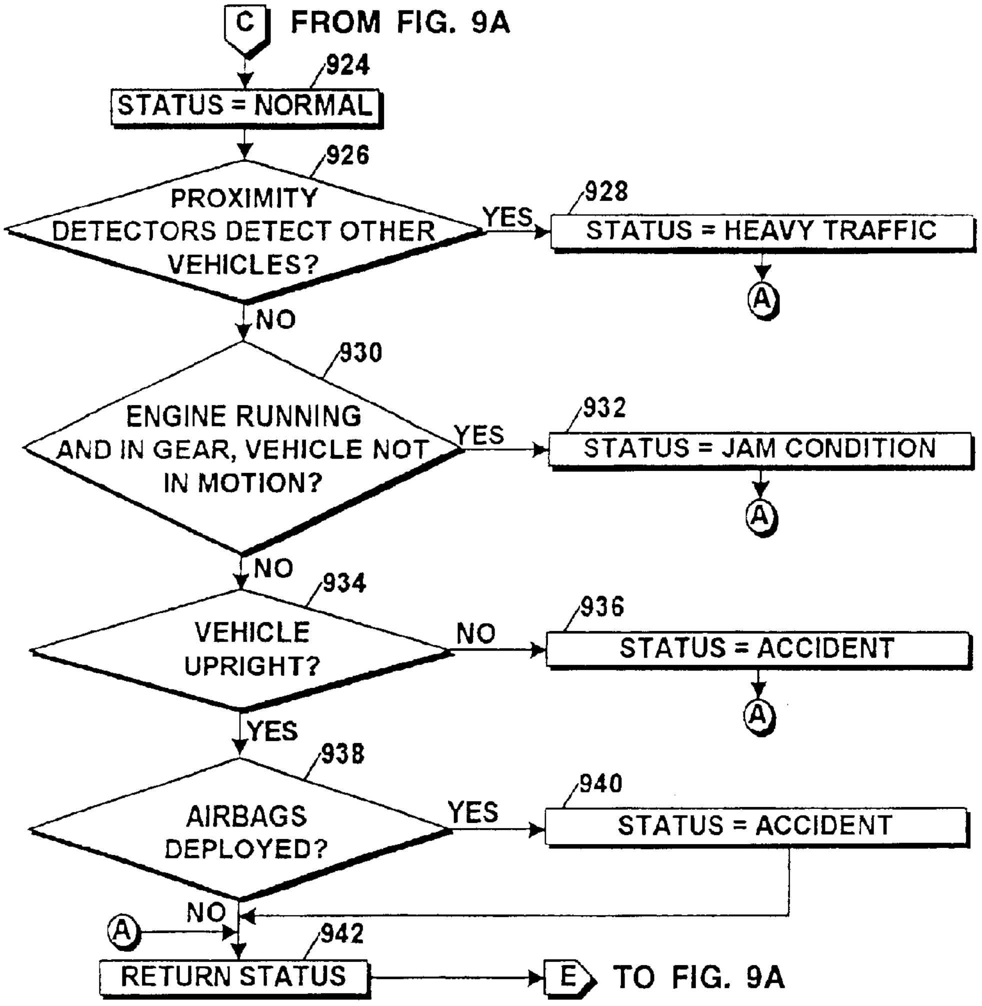

On a pre-determined cycle, an event timer triggers execution of the method of FIGS. 9A and 9B. CPU 210 requests and receives location information from GPS system 110/216 (method step 900). CPU 210 requests and receives vehicle velocity information from GPS system 110/216 or vehicle data bus 212 (method step 902). If optional sensors are enabled (branch step 904), then other in-vehicle sensors are queried including, but not limited to, thermometer, windshield wiper usage detector, and brightness gage (method step 906). Incident sensors are tested (method step 908), the details of which are outlined in FIG. 9B and described next.

Referring to FIG. 9B, an illustrative example of an incident processing method includes initially setting a "STATUS" variable to "NORMAL" (method step 924). If the status is changed as a result of any of the branch steps of this method, the method returns STATUS immediately (method step 942) to be reported to receivers within the USITSA implementation. If proximity detectors sense vehicles, perhaps above a pre-defined, dynamic, or user-established threshold, (branch step 926), STATUS is set to HEAVY TRAFFIC (method step 928) and control is returned to branch step 910. If the vehicle's engine is running and in gear, but the vehicle is not in motion, i.e. the vehicle's differential speed, (branch step 930) STATUS is set to JAM CONDITION (method step 932) and control is returned to branch step 910. If the vehicle is not upright, (branch step 934) STATUS is set to ACCIDENT (method step 936) and control is returned to branch step 910. If the vehicle's airbags are deployed, (branch step 938) STATUS is set to ACCIDENT (method step 940) and control is returned to branch step 910.

If STATUS is not NORMAL (branch step 910), then there are incidents to report, and CPU 210 performs the processing required to report a non-normal status (method step 912). CPU 210 then creates a message packet 624 from sensor and incident information 628 according to the required protocol (method step 914). If authentication is enabled (branch step 916), then the message packet 624 is digitally signed with digital credentials (method step 918). Digital electronic credentials are used to identify parties online and enable private, encrypted communications. If internet is enabled (branch step 920), the internet connection is established via cell phone or other technology (method step 922), and control is returned to branch step 806.

Referring to FIGS. 6B, 7, and 8, if the data are received into an emergency vehicle (branch step 806), special emergency probe data 630 are received by the in-vehicle CPU 210. These data 630 are combined with normal vehicle probe data 622, formed into the data portion 634 of communications packets, and transmitted to the Emergency Management subsystem implementation 700 for further processing, and then to the Traffic Management subsystem implementation 614 (method step 808). If the data are received into a non-emergency vehicle, the probe data 622 are packetized 624, with anonymity protocol 620 enabled if required, and sent to the ISP subsystem implementation 608 (method step 810). The ISP subsystem implementation 608 receives the location-tagged probe data 628, preserves anonymity if the anonymity protocol is recognized (method step 814). The ISP subsystem implementation 608 combines location-tagged probe data 628 with other vehicle data, processes it further, and formats it for transfer to the Traffic Management subsystem implementation 614 (method step 816). When the Traffic Management subsystem implementation 614 receives the integrated data 626 or 638, either from the ISP subsystem implementation 608 or from the Emergency Management subsystem implementation 700, it combines the received vehicle location-tagged probe and incident data 628, 632, and 634 with data from other sources and generates information for use by the USITSA implementation. Finally, the Traffic Management subsystem implementation 614 prepares the generated information for transfer to its users, and transmits the information (method step 818).

Figure 10A:
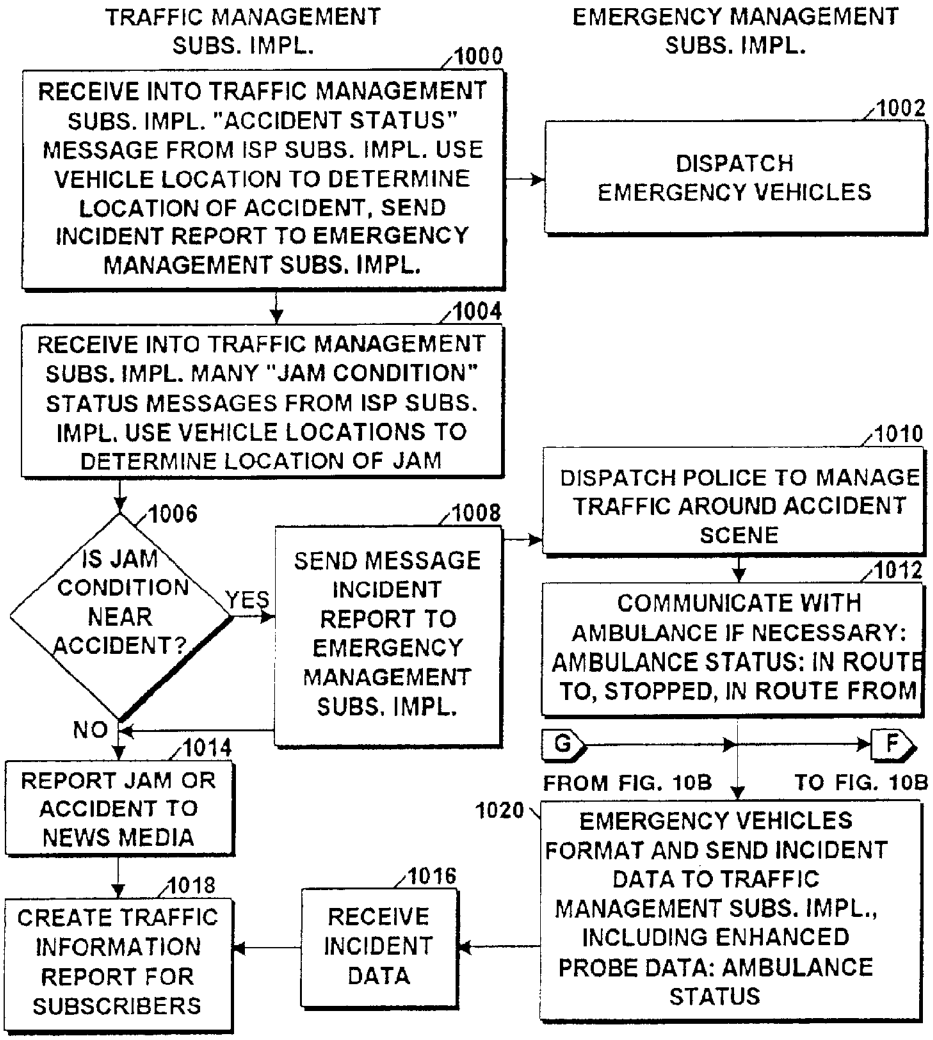
FIGS. 10A and 10B are flow charts of the method for practicing an illustrative embodiment of accident processing within the USITSA implementation of the present invention.
Figure 10B:
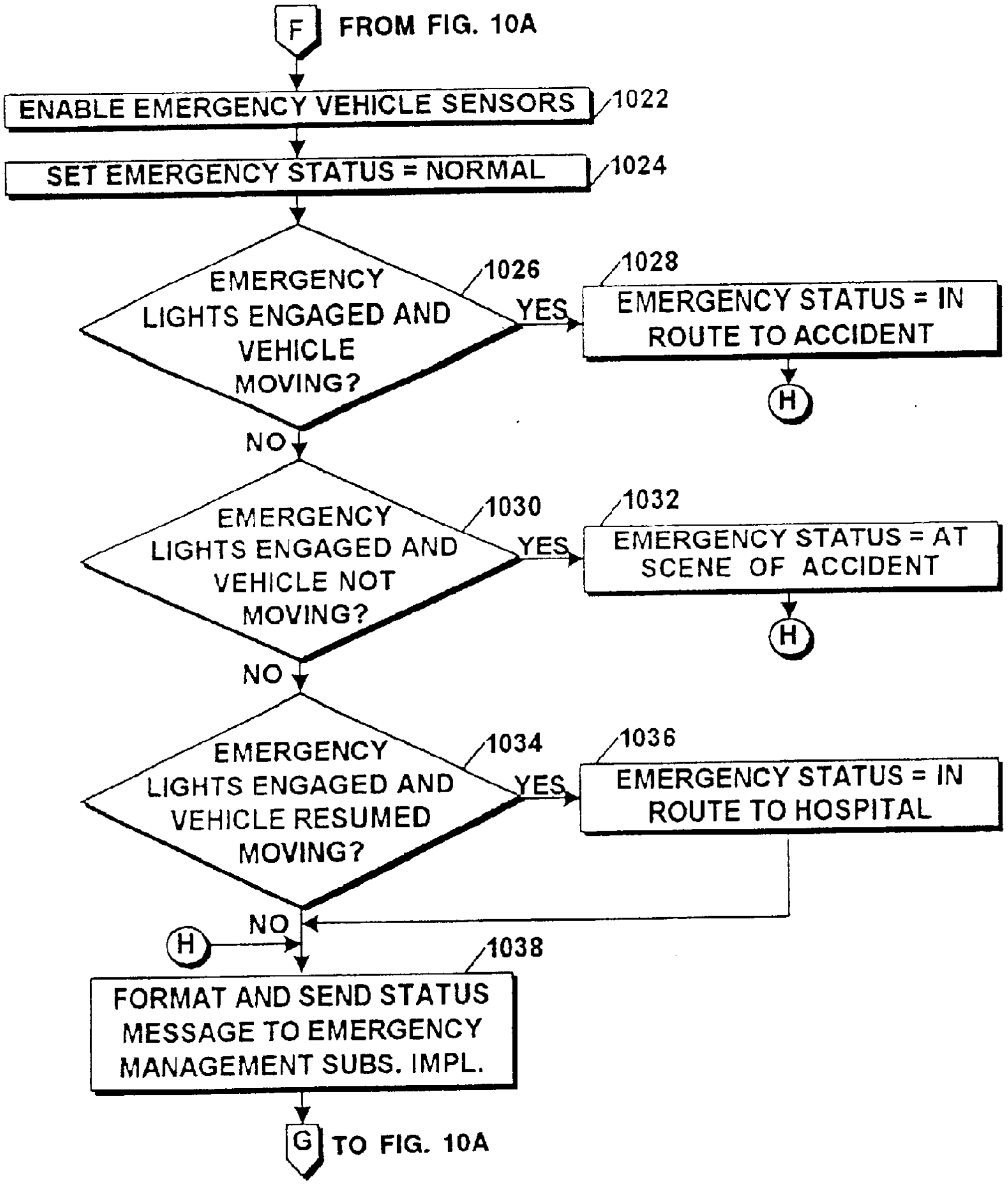

The method of the present invention that describes an example of a USITSA processing emergency vehicle data 630 when an accident has occurred is shown in FIGS. 10A and 10B. Accident processing begins with the receipt of the STATUS of ACCIDENT into the Traffic Management subsystem implementation 614 (method step 1000). During this step, the emergency location-tagged data 634 in the message is used to determine the environment of the accident, including its location. The Traffic Management subsystem implementation 614 creates and sends a message to the Emergency Management subsystem implementation 700 which directs the dispatch of emergency vehicles (method step 1002). Meanwhile, the Traffic Management subsystem implementation 614 is receiving many JAM CONDITION status messages from the ISP subsystem implementation 608 which have arrived into the ISP implementation 608 from the Vehicle subsystem implementation 600. The Traffic Management subsystem implementation 614 uses these status messages to determine the location of the traffic jam (method step 1004). If the traffic jam is in the vicinity of the accident (branch step 1006), a new incident report message is created and sent to the Emergency Management subsystem implementation 700 (method step 1008). Whether or not the traffic jam is in the vicinity of the accident, the Traffic Management subsystem implementation 614 reports the jam and/or accident to the news media (method step 1014). Meanwhile, the Emergency Management subsystem implementation 700, if there is a traffic jam near the accident, dispatches police to manage traffic (method step 1010), communicating with an ambulance if necessary, and receiving incident status data 632 from any emergency vehicles (method step 1012). In particular, an illustrative method of managing status information through normal emergency vehicle activity is shown in FIG. 10B. When an emergency vehicle is started, vehicle probes 300 are enabled and/or configured (method step 1022), and EMERGENCY STATUS is set to NORMAL (method step 1024). If emergency lights are engaged and vehicle 104 is moving (branch step 1026), EMERGENCY STATUS is set to IN ROUT TO ACCIDENT (method step 1028). Control and status are returned to method step 1038. If emergency lights are engaged and the vehicle is not moving (branch 1030), EMERGENCY STATUS is set to AT SCENE OF ACCIDENT (method step 1032). Control and status are returned to method step 1038. If emergency lights are engaged and the vehicle has resumed movement (branch 1034), EMERGENCY STATUS is set to IN ROUTE TO HOSPITAL (method step 1036). A status message containing incident status data 632 is formatted and sent to the Emergency Management subsystem implementation 700 (method step 1038), which, after processing the incoming data, formats and sends incident status 636 to the Traffic Management subsystem implementation 614 (method step 1020). When the Traffic Management subsystem implementation 614 receives incident status 636 from the Emergency Management subsystem implementation 700 (method step 1016), it creates a traffic information report, among other things, for dissemination within the USITSA network (method step 1018).

Although the invention has been described with respect to an illustrative embodiment, it should be realized this invention is also capable of a wide variety of further and other embodiments within the spirit and scope of the appended claims. In particular, any on-board vehicle sensor can provide information to an ITS network, and this system can work on aircraft and watercraft, among other mobile sensor hosts. Any number of "incident sensors" can be created: highspeed police chase, tow trucks, etc. Any wireless data network connection is feasible to use to transfer data from the vehicle to the data center.

What is claimed is:

1. An Intelligent Transportation System (ITS) roadway information system for collecting, receiving, and processing ITS information from the plurality of said mobile collection systems, the roadway information system comprising:

an ITS network for collecting, receiving, and processing roadway information from a plurality of sources;

a mobile collection system for collecting and transmitting location-tagged ITS data to said ITS network, said mobile collection system includes a sensor system for collecting mobile ITS data from at least one data probe;

a location-detecting system for determining a collection location at which said mobile ITS data were collected;

a location-tagging system, said location-tagging system creating said location-tagged ITS data by combining said mobile ITS data with said collection location;

an anonymity system for preserving anonymity of said mobile collection system;

a communications system for sending said location-tagged ITS data from said mobile collection system to said ITS network, said location-tagged ITS data wrapped in a communications message; and a computer, said computer receiving said mobile ITS data from said sensor system, said computer receiving said collection location from said location-detecting system, said computer executing, for the received said mobile ITS data, said location-tagging system to combine the received said mobile ITS data with said collection location, said computer executing said anonymity system, said computer executing said communications system to send said location-tagged ITS data to said ITS network;

an interface system for receiving said location-tagged ITS data into said ITS network, said interface system combining said location-tagged ITS data from the plurality of said mobile collection systems to provide combined data, said interface system transmitting said combined data within said ITS network;

a traffic processing system for receiving said location-tagged ITS data from said interface system, said traffic processing system creating integrated data from a combination of said location-tagged ITS data and said roadway information; and a report system for preparing a traffic report using said integrated data created by said traffic processing system.

2. The roadway information system as defined in claim 1 wherein said anonymity system comprises:

an anonymity protocol, said anonymity protocol indicating that an identity of said mobile collection system is not to be connected, within said ITS network, with said location-tagged data collected by said mobile collection system;

a combining system for preparing said communications message, said communications message including said message protocol element and said location-ragged ITS data; and an ITS anonymity system, said ITS anonymity system receiving, into said ITS network, said communications message, said ITS anonymity system preserving the anonymity of said mobile collection system within said ITS network.

3. The roadway information system as defined in claim 1 wherein said location-detecting system comprises:

a Global Positioning System (GPS) receiver interface, the interface having electronic connection with said computer; and a GPS receiver for receiving said collection location and transferring said collection location to said GPS receiver interface.

4. The roadway information system as defined in claim 1 wherein said data probe is selected from a group consisting of a thermometer, barometer, anemometer, brightness gauge, windshield wiper activity meter, vehicle velocity gauge, proximity detector, vehicle orientation detector, vehicle speed differential detector, vehicle airbag sensor, and vehicle lighting gauge.

5. The roadway information system as defined in claim 1 wherein said communications system comprises:

a wireless receiver for sending and receiving messages to and from said mobile collection system and a communications interface for transferring messages between said wireless receiver and said computer; and a message system for appending a communications protocol to said communications messages.

6. The roadway information system as defined in claim 1 wherein the interface system operates in the context of an implementation of a United States Intelligent Transportation System architecture (USITSA) Information Service Provider subsystem architecture.

7. The roadway information system as defined in claim 1 wherein the traffic system operates in the context of an implementation of a United States Intelligent Transportation System architecture (USITSA) Traffic Management subsystem architecture.

8. The roadway information system as defined in claim 7 wherein the report system operates in the context of an implementation of said Traffic Management subsystem.

9. An on-board collection system for a mobile platform comprising:

an Intelligent Transportation System (ITS) network interface positioned on-board the mobile platform, said ITS network interface allowing exchange of electronic messages between an ITS network and the mobile platform;

at least one anonymity protocol defined in said ITS network interface and defined in said ITS network, said at least one anonymity protocol allowing anonymous exchange of electronic messages between said ITS network and the mobile platform, said at least one anonymity protocol preserving anonymity of the mobile platform within said ITS network;

at least one on-board sensor, said at least one on-board sensor capable of electronic communication with the mobile platform, said at least one on-board sensor collecting data and transferring said data to the mobile platform; and a message system, said message system preparing a message containing said on-board sensor data and said at least one anonymity protocol, said message system transmitting the message using said ITS network interface to said ITS network, wherein said at least one on-board sensor is selected from a group consisting of a thermometer, barometer, anemometer, brightness gauge, windshield wiper activity meter, mobile platform velocity gauge, mobile platform airbag status, mobile platform orientation, mobile platform differential speed, proximity detector, and platform lighting gauge.

10. The collection system of claim 9 wherein said least one on-board sensor comprises an infrared data collector for measuring neighboring platform proximity.

11. The collection system of claim 9 further comprising an emergency vehicle activity data collection system for collecting emergency vehicle activity data.

12. A method for use in an ITS network of an on-board data collection system for a mobile platform comprising the steps of:

installing an ITS interface system in the mobile platform;

defining at least one anonymity protocol for use between the ITS interface system and the ITS network, the at least one anonymity protocol enabling exchange of anonymous electronic messages between the ITS network and the ITS interface system;

collecting sensor, status, and incident data from at least one mobile platform sensor;

preparing a mobile platform communications message containing the collected data and the anonymity protocol;

transmitting the mobile platform communications message from the ITS interface system to the ITS network; and selecting the at least one mobile platform sensor from a group consisting of a thermometer, barometer, anemometer, brightness gauge, windshield wiper activity meter, mobile velocity gauge, proximity detector, mobile velocity differential, mobile airbag status, mobile orientation, and platform lighting gauge.

13. A method for use in an ITS network of an on-board data collection system for a mobile platform comprising the steps of:

installing an ITS interface system in the mobile platform;

defining at least one anonymity protocol for use between the ITS interface system and the ITS network, the anonymity protocol enabling exchange of anonymous electronic messages between the ITS network and the ITS interface system;

collecting sensor, status, and incident data from at least one mobile platform sensor;

preparing a mobile platform communications message containing the collect data and the anonymity protocol;

transmitting the mobile platform communications message from the ITS interface system to the ITS network;

determining proximity of neighboring mobile platforms to the mobile platform determining mobile platform orientation;

determining mobile platform differential speed;

determining mobile platform airbag status; and computing an incident status based on the proximity, the mobile platform orientation, the mobile platform differential speed, and the mobile platform airbag status.

14. The method for use in an ITS network of an on-board data collection system as in claim 12 further comprising the step of:

collecting emergency vehicle activity data.

* * * * *

UNITED STATES PATENT AND TRADEMARK OFFICE
CERTIFICATE OF CORRECTION

PATENT NO. : 6,804,602 B2 
DATED : October 12, 2004
INVENTOR(S) : Impson et al.

It is certified that error appears in the above-identified patent and that said Letters Patent is hereby corrected as shown below:

<u>Column 13,</u>
Line 18, "location-ragged" should read -- location-tagged --;

<u>Column 15,</u>
Line 4, "collect data" should read -- collected data --; and
Line 8, "platform" should read -- platform; --.

Signed and Sealed this

Nineteenth Day of April, 2005

JON W. DUDAS
*Director of the United States Patent and Trademark Office*